United States Patent
Lavoie et al.

(10) Patent No.: US 7,012,421 B2
(45) Date of Patent: Mar. 14, 2006

(54) ENERGY CALCULATION METHODS IN POWER DISTRIBUTION SYSTEMS

(75) Inventors: Gregory P. Lavoie, Bristol, CT (US); Thomas F. Papallo, Farmington, CT (US); Ertugrul Berkcan, Clifton Park, NY (US); William James Premerlani, Scotia, NY (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 10/662,973

(22) Filed: Sep. 15, 2003

(65) Prior Publication Data

US 2004/0133370 A1    Jul. 8, 2004

Related U.S. Application Data

(60) Provisional application No. 60/438,159, filed on Jan. 6, 2003.

(51) Int. Cl.
*G01R 7/00* (2006.01)

(52) U.S. Cl. .................................................... 324/142

(58) Field of Classification Search ................ 324/142, 324/158.1, 765; 340/870.01, 870.02, 870.03, 340/870.05; 702/60, 62; 361/627, 641, 361/664, 93.2, 78, 48, 601, 63
See application file for complete search history.

(56) References Cited

U.S. PATENT DOCUMENTS

| | | | | |
|---|---|---|---|---|
| 3,660,721 A | * | 5/1972 | Baird | 361/55 |
| 4,236,186 A | * | 11/1980 | Takagi | 361/9 |
| 5,420,799 A | * | 5/1995 | Peterson et al. | 702/62 |
| 5,699,276 A | * | 12/1997 | Roos | 379/106.03 |

* cited by examiner

*Primary Examiner*—Vinh Nguyen
*Assistant Examiner*—Tung X. Nguyen

(57) ABSTRACT

A method of performing energy calculations in a power distribution system is provided. The method includes sampling a first voltage at a first module in the power distribution system; communicating the first voltage from the first module to a central controller; performing an energy calculation in the central controller based at least in part on the first voltage; and applying the energy calculation to a second module in the power distribution system. In some embodiments, the energy calculation is also based upon a second current from the second module.

7 Claims, 5 Drawing Sheets

ENERGY CALCULATION METHODS IN POWER DISTRIBUTION SYSTEMS

CROSS REFERENCE TO RELATED APPLICATIONS

This application claims benefit of U.S. Provisional Application Ser. No. 60/438,159 filed on Jan. 6, 2003, the content of which is incorporated by reference herein.

BACKGROUND OF INVENTION

The present disclosure relates to power distribution systems. More particularly, the present disclosure relates to energy calculation methods in power distribution systems.

Industrial power distribution systems commonly divide incoming power into a number of branch circuits. The branch circuits supply power to various equipment (i.e., loads) in the industrial facility. Circuit breakers are typically provided in each branch circuit to facilitate protecting equipment within the branch circuit. Circuit breakers are designed to open and close a circuit by non-automatic means and to open the circuit automatically on a predetermined overcurrent without damage to itself when properly applied within its rating. The circuit breakers commonly include protective elements enclosed within the body of the circuit breaker. One common type of protective element is known as an electronic trip unit. The circuit breaker and its protective element have proven useful at managing the protection of the loads on the circuit.

However, it can be desired to integrate the load management of the branch circuits to one another. Further, it can be desired to integrate the management of the loads on the branch circuits with the management of the power sources feeding the branch circuits. Still further, it can be desired to provide for energy calculations of the circuits within the system, where such energy calculations require both current and voltage inputs.

In order to provide this integrated protection and monitoring, prior distribution systems have required costly and difficult to implement solutions. Today, each of these functions is performed by separate hardware often with separate sensors necessary to measure system parameters and auxiliary devices in power circuit interrupters to switch the power circuits. In such prior systems, hard wire connections between all of the electronic trip units in the system was required in order to coordinate the load control decisions of each independent trip unit with the other trip units in the system. Further, hard wire connections were also required to provide information for the independent electronic trip units to the separate system performing feed management decisions. The control decisions by the separate system performing feed management decisions is made more complex because the information from the various independent electronic trip unit is typically out of phase with one another. Additionally, another hardware device is required to then provide the desired monitoring functionality.

In order to provide the desired energy calculations, some prior power distribution systems have required each breaker to have its own dedicated current transformer for current sensing and potential transformer for sensing voltage. Some prior systems have required each breaker to have its own current transformer but received the required voltage sensing from a potential transformer that was shared among two or more breakers. However, these prior systems required dedicated wiring from each circuit breaker to the shared potential transformer.

Accordingly, there is a continuing need for power distribution systems having methods of performing energy calculations in an economical, flexible, and programmable manner.

BRIEF DESCRIPTION OF THE INVENTION

A method of performing energy calculations in a power distribution system is provided. The method includes sampling a first voltage at a first module in the power distribution system; communicating the first voltage from the first module to a central controller; performing an energy calculation in the central controller based at least in part on the first voltage; and applying the energy calculation to a second module in the power distribution system. In some embodiments, the energy calculation is also based upon a second current from the second module.

A power distribution system is also provided. The system includes a main breaker, a first module, a feeder-breaker, a second module, and a central computer. The main breaker distributes power from a first power source to a power bus. The first module communicates with the main breaker and samples a first voltage of the power at the main breaker. The feeder-breaker receives power from the power bus. The second module communicates with the feeder-breaker. The central computer communicates with the first and second modules over a data network so that the central computer can determine an energy calculation of the second module based at least in part on the first voltage.

A method of performing energy calculations in a power distribution system is provided that includes sending a first voltage indicative of a voltage at a first module in the power distribution system to a central computer; performing an energy calculation in the central controller based at least in part on the first voltage; and applying the energy calculation to a second module in the power distribution system.

DETAILED DESCRIPTION OF THE INVENTION

Figure 1:
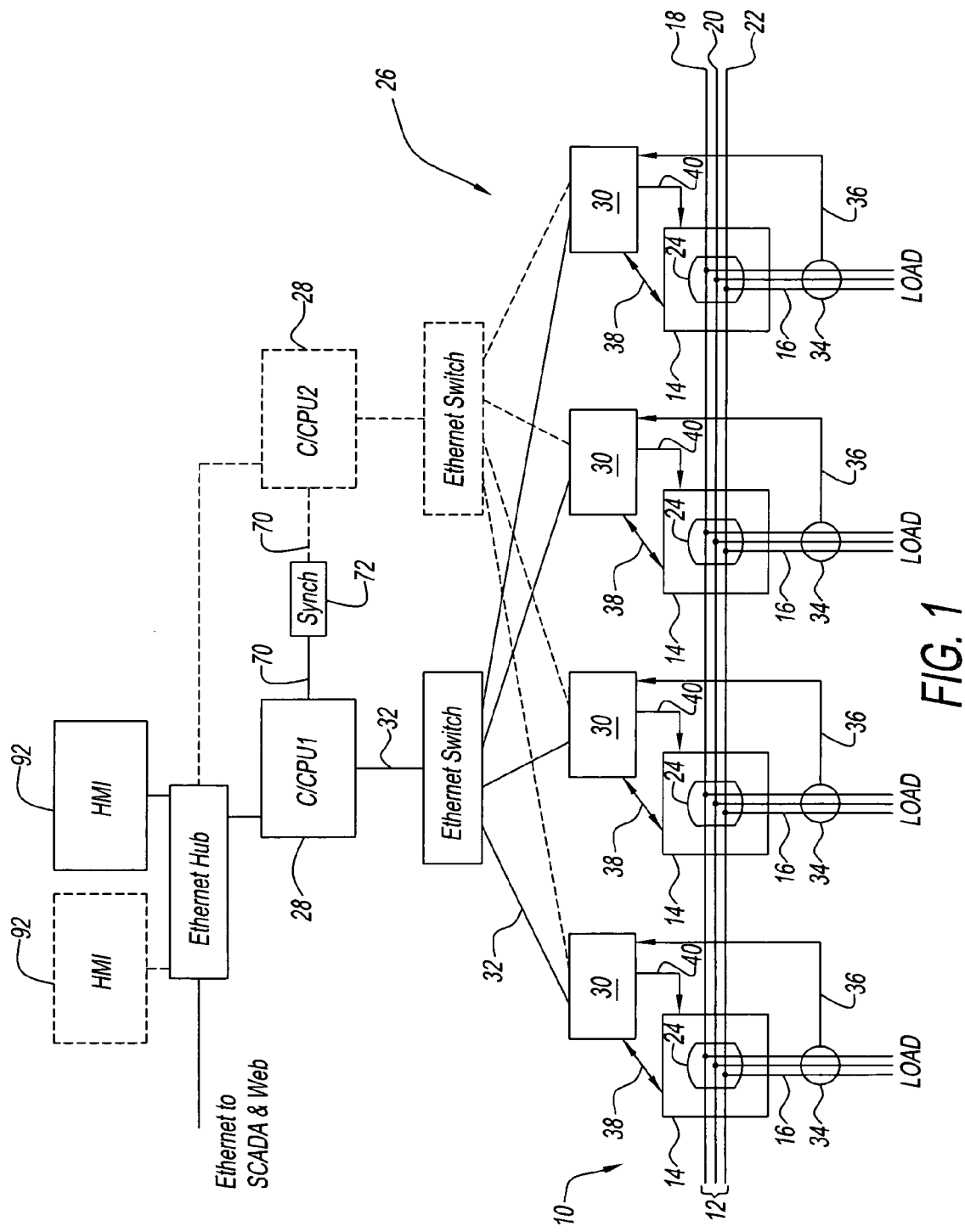
FIG. 1 is a block diagram of a power distribution system having an exemplary embodiment of an integrated protection, monitoring, and control system.

Referring now to the drawings and in particular to FIG. 1, an exemplary embodiment of a power distribution system generally referred to by reference numeral 10 is illustrated. Power distribution system 10 distributes power from at least one power bus 12 through a number or plurality of circuit breakers 14 to branch circuits 16.

Power bus 12 is illustrated, by way of example, as a three-phase power system having a first phase 18, a second phase 20, and a third phase 22. Power bus 12 can also include a neutral phase (not shown). Power distribution system 10 is illustrated, for purposes of clarity, as distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), short time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14 at predetermined ones of the circuit breakers. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. That is, network 32 is a switched Ethernet to prevent collisions.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above, by way of example only, as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at CCPU 28. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

For purposes of clarity, the load management capabilities of system 26 are described with reference to FIGS. 1 and 2, while the feed management capabilities of system 26 are described with reference to FIG. 4.

Figure 2:
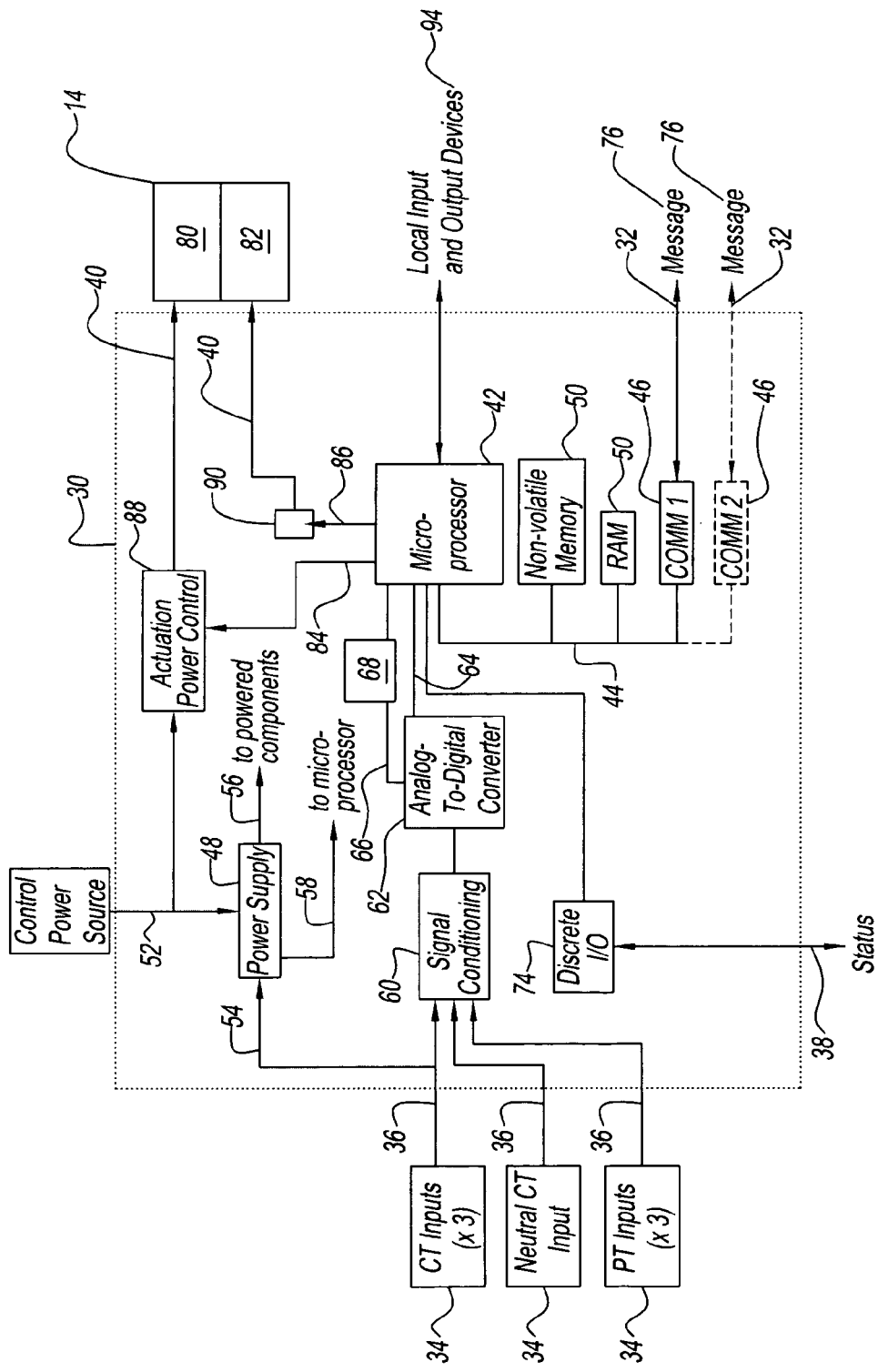
FIG. 2 is a block diagram of an exemplary embodiment of a data sample and transmission module of the integrated protection, monitoring, and control system of FIGS. 1 and 4.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a pre-determined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36 and 38 as synchronized by CCPU 28. Then, converter 62 converts the first signal 36 to digital signal 64, which is packaged, along with second signal 38 into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24) circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to second message 78 regardless of the state of first and second sources 52, 54.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Figure 3:
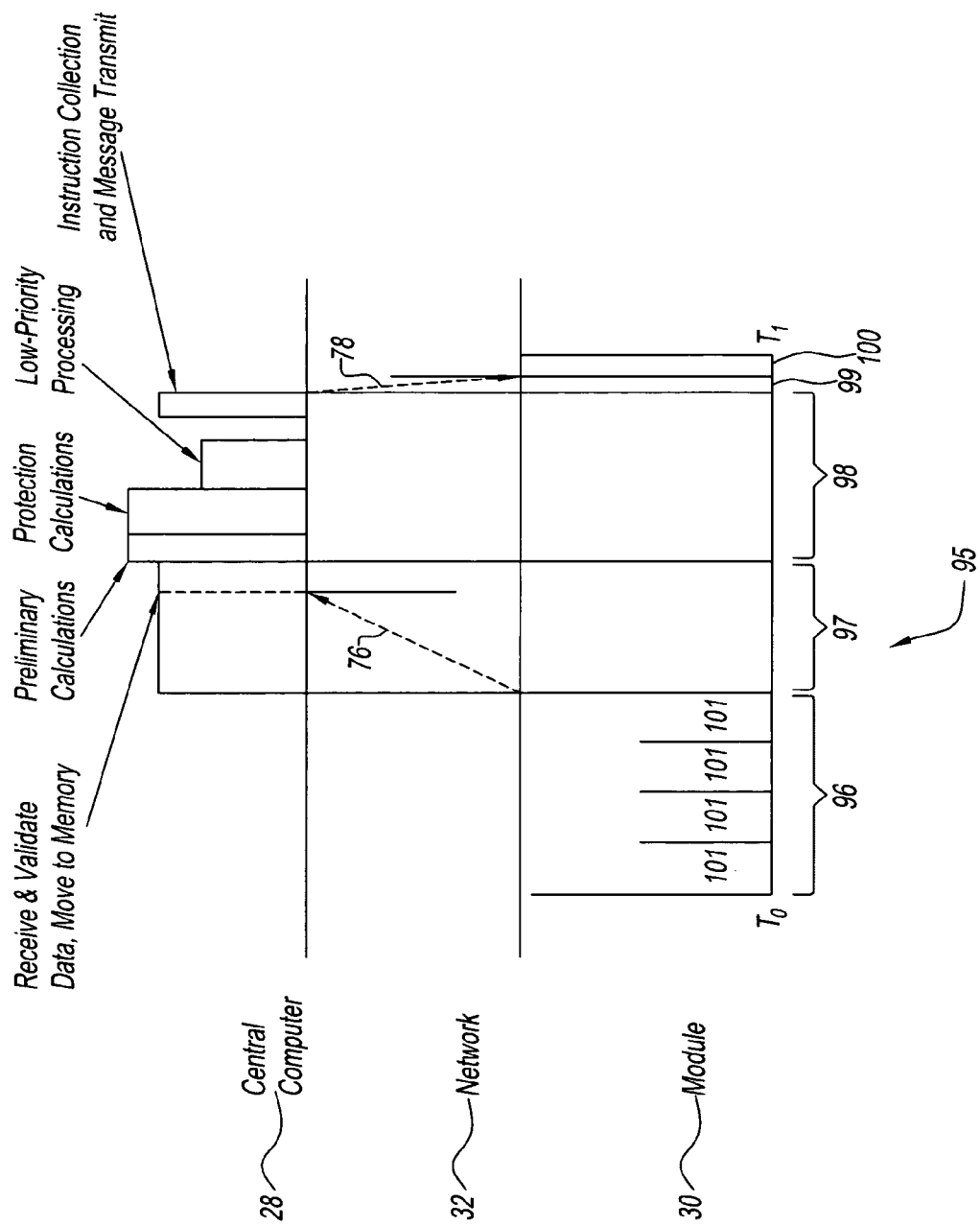
FIG. 3 illustrates an exemplary embodiment of a response time for the integrated protection, monitoring, and control system of FIG. 1.

Referring now to FIG. 3, an exemplary embodiment of a response time 95 for system 26 is illustrated with the system operating stably (e.g., not functioning in a start-up mode). Response time 95 is shown starting at T0 and ending at T1. Response time 95 is the sum of a sample time 96, a receive/validate time 97, a process time 98, a transmit time 99, and a decode/execute time 100.

In this example, system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 96 includes four sample intervals 101 of about 0.13 milliseconds (ms) each. Thus, sample time 96 is about 0.52 ms for data sampling and packaging into first message 76.

Receive/validate time 97 is initiated a fixed time delay after the receipt of synchronization instruction 70. In an exemplary embodiment, receive/validate time 97 is a fixed time that is, for example, the time required to receive all first messages 76 as determined from the latency of data network 32. For example, receive/validate time 97 can be about 0.25 ms where each first message 76 has a size of about 1000 bits, system 26 includes twenty-four modules 30 (i.e., 24,000 bits), and network 32 is operating at about 100 Mbps. Accordingly, CCPU 28 manages the communications and moving of first messages 76 to the CCPU during receive/validate time 97.

The protection processes (i.e., process time 98) start at the end of the fixed receive/validate time 97 regardless of the receipt of first messages 76. If any modules 30 are not sending first messages 76, CCPU 28 flags this error and performs all functions that have valid data. Since system 26 is responsible for protection and control of multiple modules 30, CCPU 28 is configured to not stop the entire system due to the loss of data (i.e., first message 76) from a single module 30. In an exemplary embodiment, process time 98 is about 0.27 ms.

CCPU 28 generates second message 78 during process time 98. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 99 is the time necessary to transmit second message 78 across network 32. In the example where network 32 is operating at about 100 Mbps and second message 78 is about 1600 bits, transmit time 99 is about 0.016 ms.

It is also contemplated for second message 78 to include a portion of synchronization instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 100. For example, decode/execute time 100 can be about 0.05 ms.

In this example, response time 95 is about 1.11 ms. Of course it should be recognized that system response time 95 can be accelerated or decelerated based upon the needs of system 26. For example, system response time 95 can be adjusted by changing one or more of the sample period, the number of samples per transmission, the number of modules 30, the message size, the message frequency, the message content, and/or the network speed.

It is contemplated by the present disclosure for system 26 to have response time 95 of up to about 3 milliseconds. Thus, system 26 is configured to open any of its circuit breakers within about 3 milliseconds from the time sensors 34 sense conditions outside of the set parameters.

Accordingly, system 26 is centrally controlled by CCPU 28 to protect power distribution system 10 during the distribution of power to the loads (i.e., circuits 16).

Figure 4:
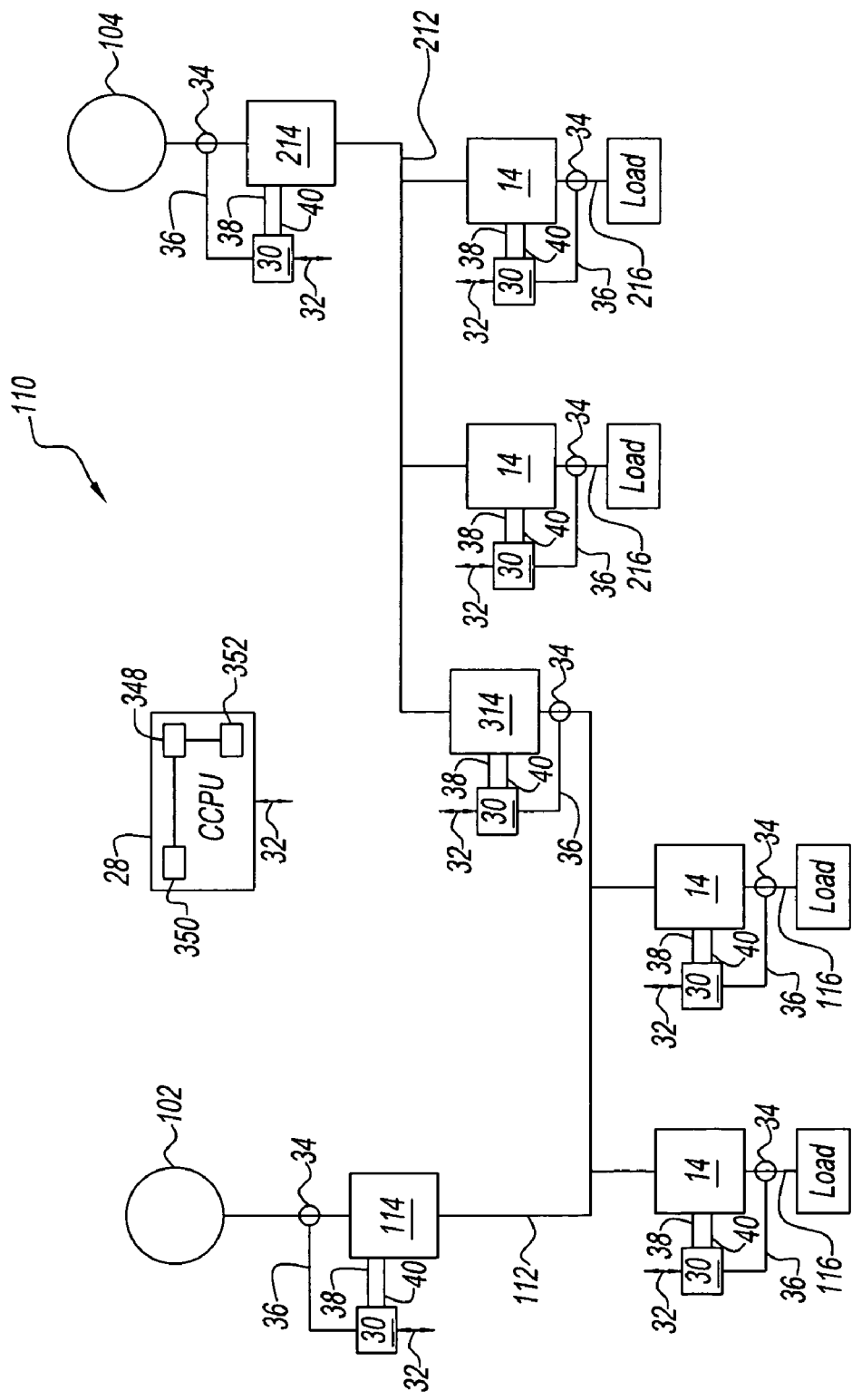
FIG. 4 is a block diagram of a second power distribution system having an integrated protection, monitoring, and control system.

In addition to this load management capability, system 26 can also provide integrated feed management capabilities to a power distribution system 110 as illustrated in FIG. 4 where component parts performing similar and/or analogous functions are labeled in multiples of one hundred. Further, power distribution system 110 also illustrates the energy calculation capabilities of system 26. Specifically, it has also been found that system 26 can be configured to apply the voltage samples collected at one circuit breaker having a PT to the functions defined at other circuit breakers that are not connected to a PT. In this manner, system 26 eliminates the dedicated PTs of some prior systems and eliminates the dedicated wiring from each breaker to a shared PT of other prior systems. Thus, it has been found that system 26 can be implemented easier and less expensively than such prior systems.

Power distribution system 110 has a first source 102 and a second source 104. First and second sources 102, 104 provide power from, for example, an electric generator driven by a prime mover locally, or a power grid of an electric utility. The prime mover may be powered from, for example, but not limited to, a turbine or an internal combustion engine. In an exemplary embodiment, first source 102 provides power from a first point (not shown) on a power grid, while second source 104 provides power from a second point (not shown) on the power grid.

Power from first source 102 is connectable to a first bus 112 by a first main breaker 114. First bus 112 is divided into a number of circuits 116 by feeder-breakers 14. Thus, circuits 116 can be provided with power from first source 102 by closing first main breaker 114 and feeder-breakers 14 on first bus 112.

Similarly, power from second source 104 is connectable to a second power bus 212 by a second main breaker 214. Second bus 212 is divided into a number of circuits 216 by feeder-breakers 14. Thus, circuits 216 can be provided with power from second source 102 by closing second main breaker 214 and feeder-breakers 14 on second bus 212. First and second buses 112, 212 are also connectable to one another by a tie-breaker 314.

Power distribution system 110 is provided with system 26. Specifically, each breaker 14, 114, 214, and 314 in power distribution system 110 includes module 30 communicating with CCPU 28 via network 32. Advantageously, system 26 manages the distribution of power from power sources 102, 104 using the same set of data as used for the load management. Further, system 26 manages the distribution of power from power sources 102, 104 simultaneous with the load management control decisions. In this manner, system 26 can integrate the load management decisions with the feed management decisions and, thus, can provide for more precise control of power distribution system 110 than previously possible.

System 26 can also allow first main breaker 114 to be configured to handle the maximum current that first bus 112 may carry. Additionally, first main breaker 114 can include a current setting equal to that of each of breakers 14 on first bus 112 and a time characteristic that allows the first main breaker to provide backup protection to each individual breaker at that breaker's setting. In this example, CCPU 28 would simultaneously monitor the current at first bus 112 and each of the branch circuits 116, reacting to an undesirable current at any point. Thus, system 26 can provide each branch circuit 116 with secondary backup protection optimally set to supplement the primary protection with no compromise needed to achieve selectivity or to allow the bus current to flow unimpeded.

Accordingly, system 26 integrates the load management of the branch circuits to one another. Further, system 26 integrates the management of the loads on the branch circuits with the management of the power sources feeding the branch circuits. Still further, system 26 provides this integrated functionality in a single central processor. This allows system 26 to adjust the protection functions of each breaker 14, 114, 214, 314 in the system based on the state of that breaker as sampled by first and second signals 38, 40, as well as based on the status of any and/or all of the other breakers in the system.

Figure 5:
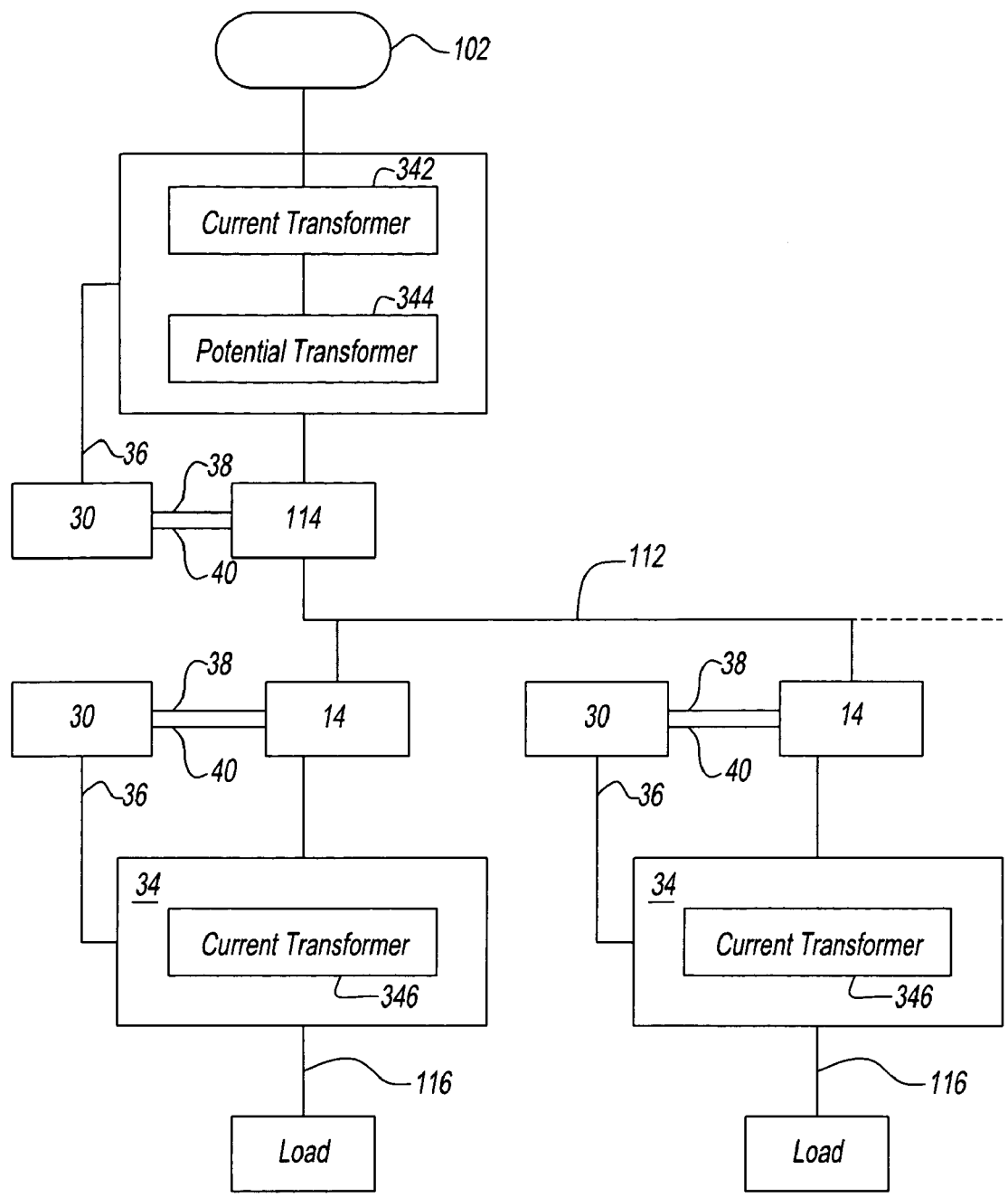
FIG. 5 is a sensor diagram of a relevant portion of FIG. 4.

Referring now to FIGS. 4 and 5, an exemplary embodiment of sensors 34 used by system 26 for energy calculations are illustrated. It has been found that CCPU 28 can use a current sample from a sensor at one circuit breaker and a voltage sample from a sensor at a different circuit breaker for energy calculations within portions of system 26.

Specifically, it has been determined that the phase voltage at a number of circuit breakers in power distribution system 110 is often the same. Therefore, it has been determined that system 26 can apply the voltage samples collected at one circuit breaker having a PT to the functions defined at other circuit breakers that are not connected to a PT. This results in a cost saving of eliminating a separate PT and the wiring therefore at such other circuit breakers. In one embodiment, system 26 provides energy calculations using current signals from one breaker in combination with voltage signals from another breaker.

As seen in FIG. 5, main breaker 114 includes both a CT 342 and a PT 344. However, feeder-breakers 14 have only a CT 346. Main breakers 114 and feeder-breakers 14 are in series with one another and, thus see essentially the same voltage. Accordingly, it has been determined that CCPU 28 can utilize the voltages sensed by PT 344 at main breaker 114 in combination with the currents sensed by CT 346 at feeder-breaker 14 for algorithms that control that particular feeder-breaker. Therefore, it has been found that in system 26 there is no need to have separate PTs or even connections to shared a PT at each feeder-breaker as in the prior art systems.

In one embodiment of system 26, each module 30 in power distribution system 110 can include programmable PT parameters at CCPU 28. For example, CCPU 28 can include a PT rating parameter 348 and a PT source identifier 350. PT rating parameter 348 specifies the rating and configuration of the PT, if any, of a sensor 34 associated with a given module 30. PT source identifier 350 indicates what PT a given module should use as its voltage source.

For example, consider the system of FIG. 5 that has one main breaker 114 connected to two feeder-breakers 14, where each breaker has a corresponding module 30. Module 30 of main breaker 114 includes both CT 342 and PT 344, while module 30 of the two feeder-breakers 14 each have only a CT 346. Specifically, feeder-breakers 14 do not have any PT. Instead, CCPU 28 includes PT rating parameter 348 and PT source identifier 350 configured such that the CCPU uses the voltage information from PT 344 of main breaker 114 to perform the functions requiring voltage samples for the two feeder-breakers 14.

In addition, CCPU 28 can include a CT polarity parameter 352 configured such that the CCPU can compensate for the polarity of power flowing through each breaker 14, 114, 214, and 314, as required, to a selected polarity. Advantageously, CCPU 28 having CT polarity parameter 352 has been found to provide benefits in both during the initial set-up of system 26 and during the dynamic operation of the system. The ability to simply modify CT polarity parameter 352 in the program resident on CCPU 28 to reverse the polarity of the signal sensed by CTS 342 and 346 mitigates several problems experienced during the start-up of prior systems. For example, in prior systems the system would need to be powered down in the event that CT was installed with an incorrect polarity. In system 26, this same wiring error can be corrected by simply adjusting CT polarity parameter 352 in CCPU 28.

The ability to simply modify CT polarity parameter 352 in the program resident on CCPU 28 to reverse the polarity of the signal sensed by CTS 342 and 346 also mitigates problems experienced during the dynamic throw-over operations of prior systems. In the embodiment illustrated in FIG. 4, power distribution system 110 can be operated in a Main-Tie-Main switchgear scheme in which only one of the sources 102 and 104 is operative at a time. That is, only breaker 114 or breaker 214 is active at a time (one breaker open and one breaker closed). For this scenario, tie breaker 314 is necessary and is used to power all feeders from the operative source. In this embodiment, CCPU 28 is configured to detect which main breaker (114 or 214) is active and to utilize PT rating parameter 348 and PT source identifier 350 for that main breaker for all feeder-breakers 14 in power distribution system 110. However, CCPU 28 is also configured to adjust CT polarity parameter 352 based on which main breaker (114 or 214) is active.

For the example in FIGS. 4 and 5, PT rating parameter 348, PT source identifier 350, and CT polarity parameter 352 would be populated as follows when main breaker 114 is closed, main breaker 214 is open, and tie breaker 314 is closed:

| Breaker | PT Rating Parameter 348 | PT Source Identifier 350 | CT Polarity Parameter 352 |
| --- | --- | --- | --- |
| Main breaker 114 | 480 V Wye | Main breaker 114 | Forward |
| Feeder-breakers 14 | None | Main breaker 114 | Reverse |
| Tie breaker 314 | None | Main breaker 114 | Forward |

However, PT rating parameter 348, PT source identifier 350, and CT polarity 352 would be populated as follows when main breaker 114 is opened, main breaker 214 is closed, and tie breaker 314 is closed:

| Breaker | PT Rating Parameter 348 | PT Source Identifier 350 | CT Polarity Parameter 352 |
| --- | --- | --- | --- |
| Main breaker 214 | 480 V Wye | Main breaker 214 | Forward |
| Feeder-breakers 14 | None | Main breaker 214 | Reverse |
| Tie breaker 314 | None | Main breaker 214 | Reverse |

As seen in this example, system 26 having PT rating parameter 348, PT source identifier 350, and CT polarity 352 resident on CCPU 28 provides flexibility in both the static or initial configuration of the system as well as during the dynamic operation of the system.

In this manner, CCPU 28 can perform energy calculations such as, but not limited to, watt-hours, watts, varhours, vars, VA hours, VA and power factor for each module using the reference voltage sample for that module. Moreover, system 26 can provided these benefits without the need for PTS at every module 30 in system 10. As noted previously, the samples are taken in a predetermined time window that is synchronized to within 5 microseconds. This allows CCPU 28 in this example to accurately perform the desired energy calculations for each module 30.

Other functions besides metering are enabled by this disclosure. For example, it is possible to perform relay functions that require voltage information at breakers that do not actually have PTs attached. In the example above, CCPU 28 could perform an undervoltage function, a reverse power flow function, a low power factor function, etc. at any of the modules that do not have PTs. Thus, system 26 can determine a function of system 10 based at least in part on the energy calculation. For example, system 26 can determine undervoltage detection, reverse power flow, low power factor, overvoltage, voltage imbalance, voltage relays, and power relays.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A power distribution system comprising:
    a main breaker that distributes power from a first power source to a power bus;
    a first module in communication with said main breaker, said first module providing digital samples of a first voltage of said power at said main breaker;
    a feeder-breaker that receives said power from said power bus;
    a second module in communication with said feeder-breaker, said second module providing digital samples of a current of said feeder-breaker; and
    a central computer in communication with said first and second modules over a data network so that said central computer can determine an energy calculation of said second module based at least in part on said digital samples of said first voltage and said digital samples of said current of said feeder-breaker.

2. The system as in claim 1, wherein said second module comprises only a current sensor.

3. The system as in claim 1, wherein said second module samples only said current of said power at said feeder-breaker.

4. The system as in claim 3, wherein said first voltage and said current are sampled at substantially the same time.

5. The system as in claim 3, wherein said central computer determine said energy calculation of said second module based at least in part on said first voltage and said current.

6. The system as in claim 1, further comprising a voltage sensor source identifier resident on said central computer, said central computer determining a source of voltage for said energy calculation based on said voltage sensor source identifier.

7. A power distribution system comprising:
    a first breaker for distributing power from a first power source to a power bus;
    a first module in communication with said first breaker, said first module having a first current sensor for generating a first current signal of said power at said first breaker;
    a second breaker for receiving said power from said power bus and distributing said power to a load;
    a second module in communication with said second breaker, said second module having a second current sensor for generating a second current signal of said power at said second breaker; and
    a central computer in communication with said first and second modules over a data network, said central computer having a first polarity parameter so that said central computer can compensate for a polarity of said power flowing through said first breaker to a first selected polarity, and said central computer having a second polarity parameter so that said central computer can compensate for a polarity of said power flowing through said second breaker to a second selected polarity.

* * * * *